C. E. STELLER.
Harrow.
No. 37,061.
Patented Dec. 2, 1862.
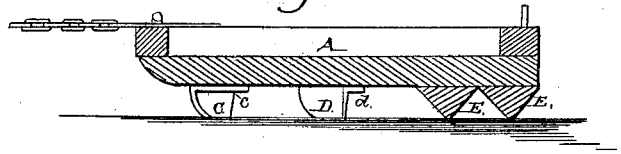
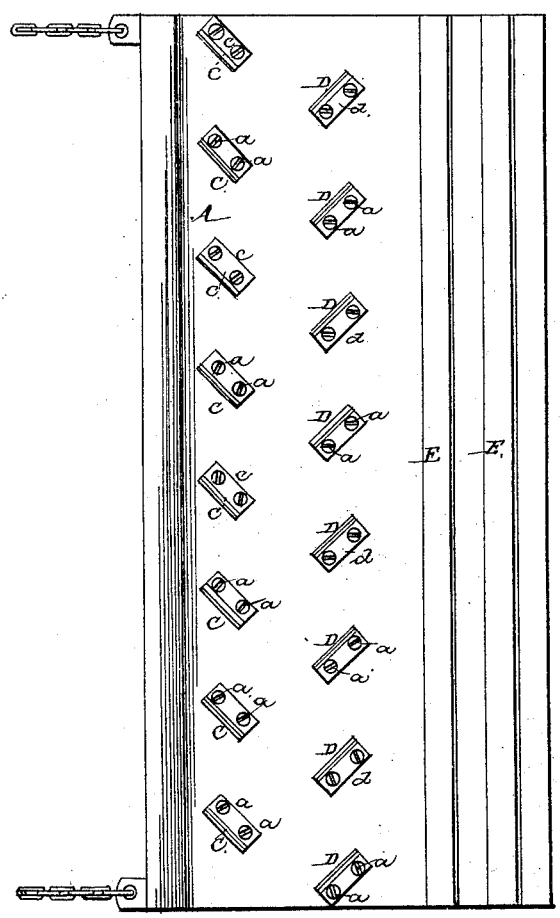
Witnesses.
J. W. Coombs
G. W. Reed
Inventor:
C. E. Steller
per Munn & Co
attorneys

UNITED STATES PATENT OFFICE.

C. E. STELLER, OF GENESEE, WISCONSIN.

IMPROVEMENT IN HARROWS.

Specification forming part of Letters Patent No. 37,061, dated December 2, 1862.

*To all whom it may concern:*

Be it known that I, C. E. STELLER, of Genesee, in the county of Waukesha and State of Wisconsin, have invented a new and Improved Harrow; and I do hereby declare that the following is a full, clear, and exact description of the same, reference being had to the accompanying drawings, forming a part of this specification, in which—

Figure 1 represents a transverse vertical section of my invention. Fig. 2 is an inverted plan of the same.

Similar letters of reference indicate corresponding parts in the two figures.

This invention consists in the arrangement of two or more rows of flanged teeth, rounded at their front edges and secured to the frame in oblique positions, one row being inclined to the right, the other to the left, and so disposed that they cover the whole line, in combination with longitudinal triangular ribs attached to the same frame with the teeth in such a manner that by the action of the teeth, when the harrow is drawn over the field, every particle of ground is disturbed and pushed off first in one direction and then in the other, and by the action of the triangular ribs the ground is fully smoothed, pulverized, and leveled.

To enable those skilled in the art to make and use my invention, I will proceed to describe its construction and operation with reference to the drawings.

A represents the frame, which is made of wood or any other suitable material, in a rectangular or any other desirable form or shape. The bottom part of this frame is or may be made of a solid piece of board, the front edge of which is rounded, so that it passes easily over obstructions. To the lower surface of this frame two or more rows of teeth, C D, are firmly secured in oblique positions, as clearly shown in Fig. 2 of the drawings. The teeth C of the first row are inclined toward one and the teeth D of the second row toward the other end of the frame A, and they are provided with flanges c d, so that they can conveniently be secured to their places by means of screws a. The points of the teeth are rounded similar to the front edge of the frame, so as to clear grass, straw, roots, &c., and to slide readily over any obstruction that might come in their way.

The teeth of the second row stand opposite the spaces between the teeth of the first row, and vice versa, so that the same cover the whole line, and in being drawn over the land the teeth of the first row throw the ground in one and those of the second row throw it in the opposite direction, and by the combined action of the teeth every particle of ground is disturbed. Sufficient space is left between the teeth for the ground to pass through.

To the rear part of the frame A two or more triangular bars or ribs, E, are firmly secured. These ribs are situated behind the teeth C D, and in passing over the ground they smooth, pulverize, and level the same perfectly; and when my harrow is attached to a seeding-machine the seed which is discharged from said machine is all covered to a uniform depth.

Having thus fully described my invention, what I claim as new, and desire to secure by Letters Patent, is—

The arrangement of two or more rows of teeth, C D, secured by means of flanges c d and screws a, or their equivalents, in oblique positions to the frame A, in combination with the triangular bars or ribs E on the rear part of the frame A, all constructed and operating in the manner and for the purpose specified.

C. E. STELLER.

Witnesses:
J. B. MONTEITH,
JOHN COLLINS.